(12) United States Patent
Coleman et al.

(10) Patent No.: US 8,182,181 B2
(45) Date of Patent: May 22, 2012

(54) CARGO TIE-DOWN

(76) Inventors: Douglas A. Coleman, Hubbard, OR (US); Terri L. Coleman, Hubbard, OR (US)

(*) Notice: Subject to any disclaimer, the term of this patent is extended or adjusted under 35 U.S.C. 154(b) by 256 days.

(21) Appl. No.: 12/612,954

(22) Filed: Nov. 5, 2009

(65) Prior Publication Data
US 2011/0103914 A1    May 5, 2011

(51) Int. Cl.
*B60P 7/08* (2006.01)
(52) U.S. Cl. .............. 410/98; 410/97; 410/116
(58) Field of Classification Search .......... 410/98, 410/34, 50, 96, 97, 100, 106, 110, 116; 248/499; 24/299, 265 CD
See application file for complete search history.

(56) References Cited

U.S. PATENT DOCUMENTS

| | | | |
|---|---|---|---|
| 3,960,091 A | 6/1976 | Ehlert | |
| 4,011,974 A | 3/1977 | Scarola | |
| 5,273,382 A | 12/1993 | Yearick | |
| 5,351,372 A | 10/1994 | Ihara | |
| 5,762,455 A | 6/1998 | Long | |
| 5,911,369 A | 6/1999 | Yamazaki | |
| 6,109,844 A * | 8/2000 | Nadherny et al. | 410/34 |
| 6,317,936 B1 | 11/2001 | McDaid et al. | |
| 2002/0148080 A1 | 10/2002 | Sonju | |

* cited by examiner

*Primary Examiner* — Stephen Gordon
(74) *Attorney, Agent, or Firm* — Timothy E Siegel Patent Law, PLLC; Timothy E Siegel

(57) ABSTRACT

A cargo carrier tie-down assembly that utilizes a fastener made up of a shackle element that includes a wall in a form that is closed in two dimensions, defining an opening and wherein the wall also defines a pair of opposed apertures, a pin that can be inserted through the two apertures and a knob fastener element, having a head, that is sized to be passed through the opening when the pin is withdrawn from the wall, and that is retained when the pin is inserted into the two apertures. A tension member has one of the fastener elements attached to at least one end. The other fastener element is attached to the cargo carrier.

7 Claims, 2 Drawing Sheets

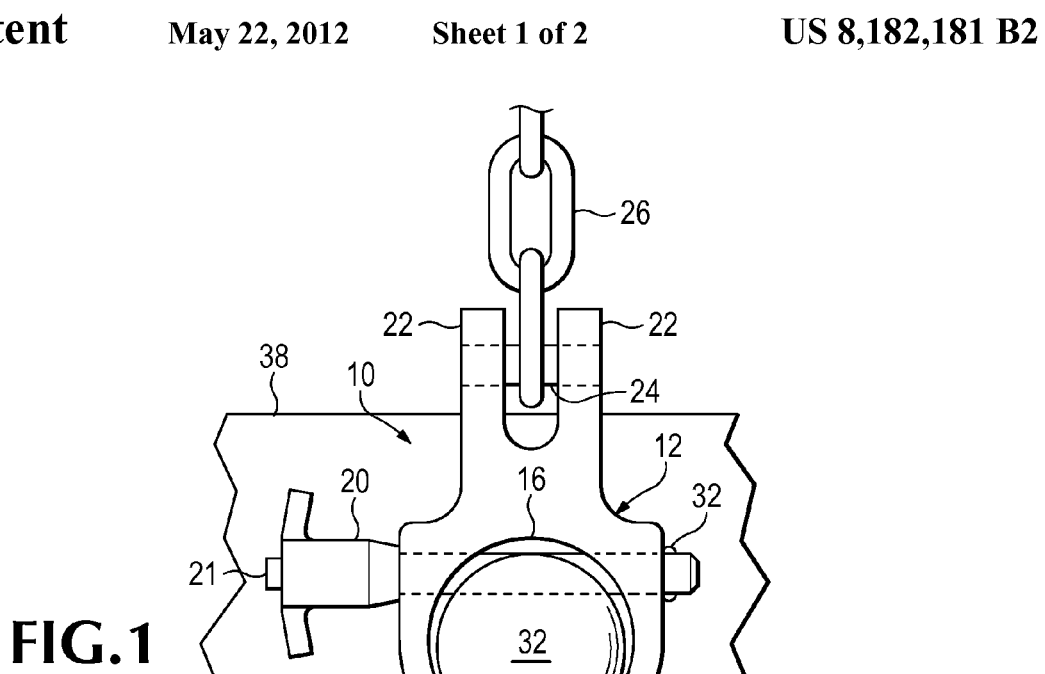
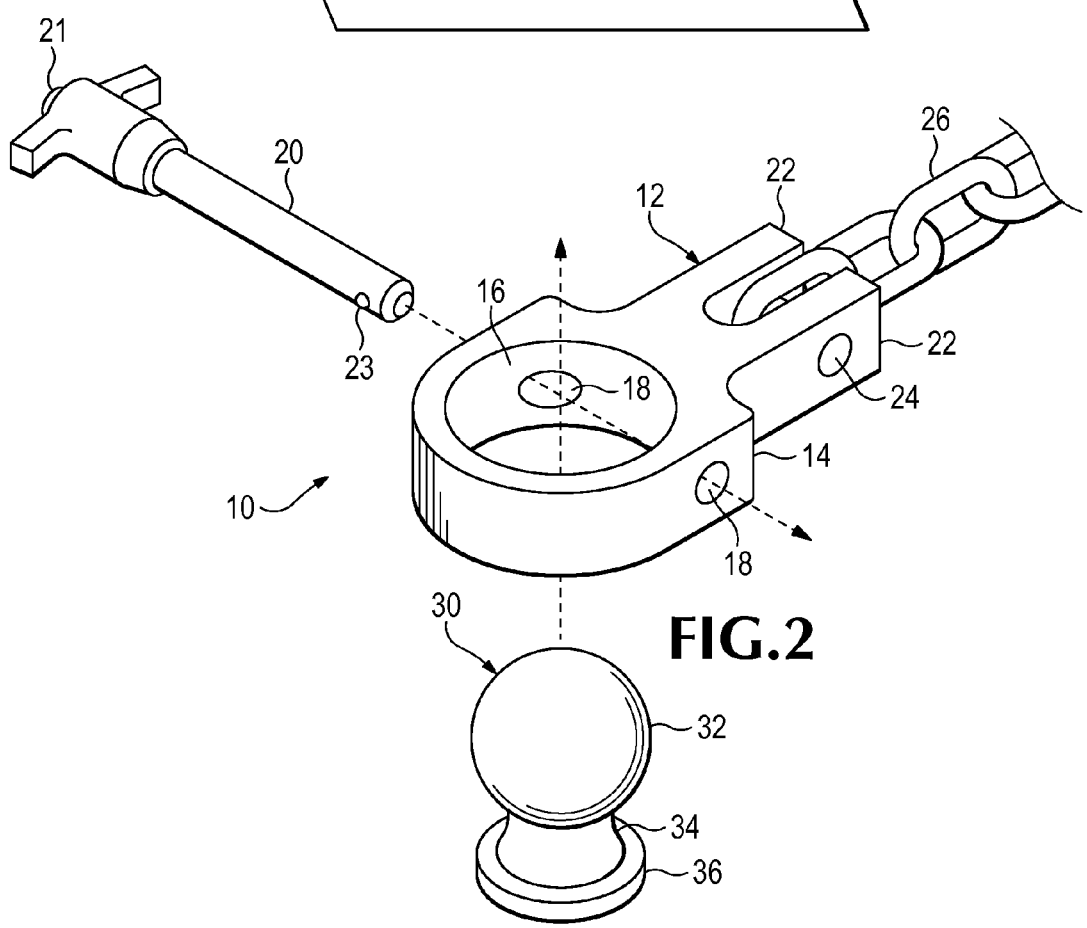

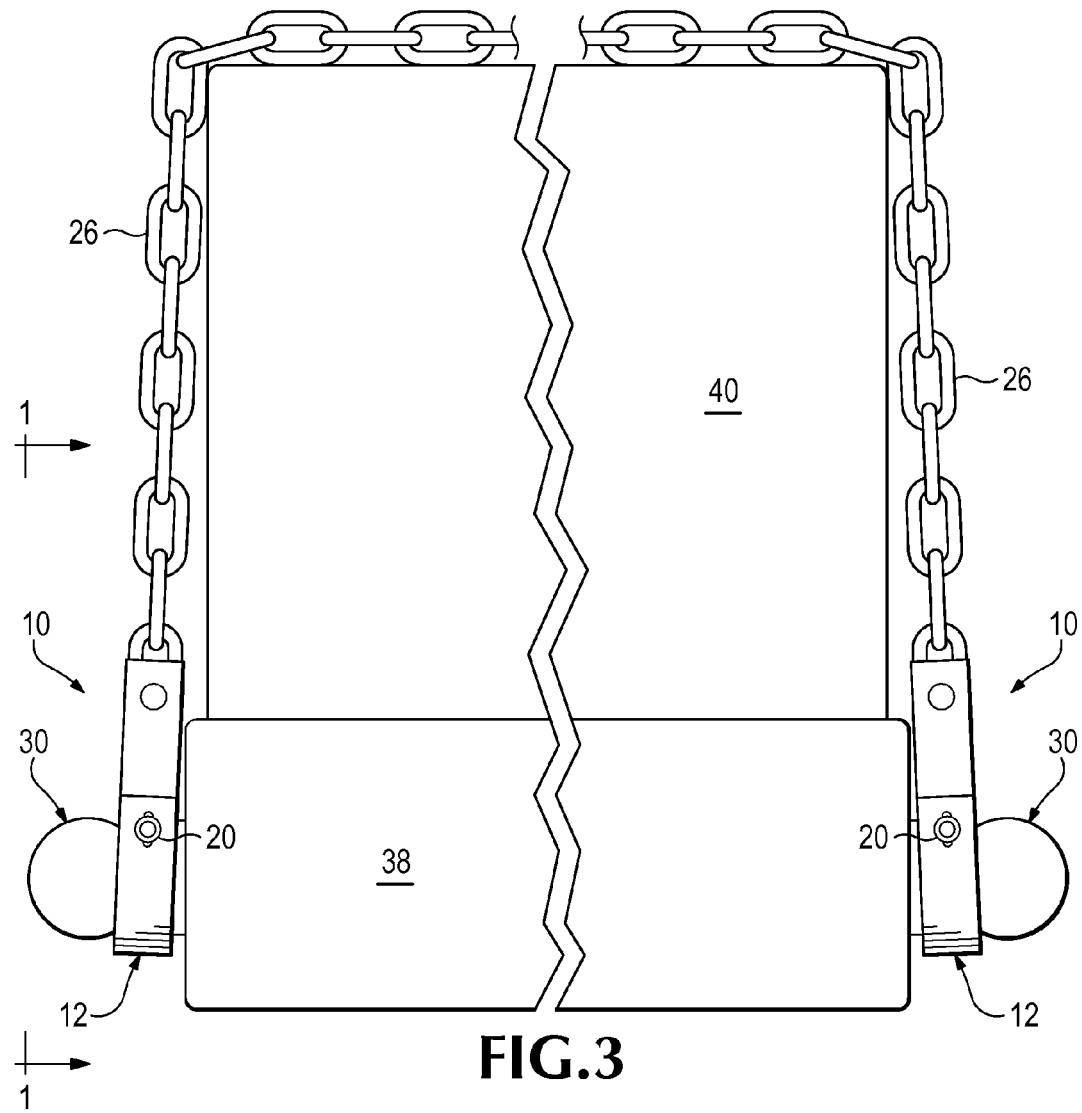

CARGO TIE-DOWN

BACKGROUND

Much cargo is transported without being placed into a complete enclosure. For example, a large piece of construction equipment is typically tied-down on a flat-bed truck and loose agricultural produce may be loaded into trailer that is open on top, but covered with a tarp that is tied-down with cables that are hitched to the sides of the truck, typically by means of a hook on the end of the cable fastened to a D-ring on the side-bottom of the truck.

There are a number of problems with this type of arrangement. First, there is the possibility that the hook will work its way loose from the D-ring. The occasional truck on the side of the road, spotted by travelers, may have been waylaid by exactly this type of problem.

Although a carabineer on the end of a bungee has been sold and used to tie down loads on pickup trucks, it appears that this type of closed attachment has not been adopted in the commercial trucking business, perhaps because a carabineer might get bent under the greater forces encountered.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a cargo carrier tie-down assembly that utilizes a fastener made up of a shackle element that includes a wall in a form that is closed in two dimensions, defining an opening and wherein the wall also defines a pair of opposed apertures, a pin that can be inserted through the two apertures and a knob fastener element, having a head, that is sized to be passed through the opening when the pin is withdrawn from the wall, and that is retained when the pin is inserted into the two apertures. A tension member has one of the fastener elements attached to at least one end. The other fastener element is attached to the cargo carrier.

In a second separate aspect, the present invention may take the form of a method of tying down cargo on a cargo carrier, which makes use of a fastener that has a shackle fastener element that includes a wall in a form that is closed in two dimensions, defining an opening, and wherein the wall also defines a pair of opposed apertures, a pin that can be inserted into the two apertures and a knob fastener element having head and a neck, the head being sized to be passed through the central area when the pin is withdrawn from the wall, and that is retained when the pin is inserted into the two apertures. One of the fastener elements is attached to a tension member and attaching the other fastener to the cargo carrier. The other fastener element is engaged to the tension member and to the fastener element on the cargo carrier and the pin is inserted into the shackle fastener element.

In a third separate aspect, the present invention may take the form of a heavy-duty fastener that has a shackle element, that includes a wall of greater than 1 cm thick material in a form that is closed in two dimensions, defining an opening that is greater than 3 cm across at it's narrowest. The wall also defines a pair of opposed apertures, a pin that can be inserted through the two apertures and a knob element, having a head and a neck, the head being sized to be passed through the opening when the pin is withdrawn from the wall, and that is retained when the pin is inserted into the two apertures.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 1 is a side view of a fastener of the tie-down system of FIG. 1.

FIG. 2 is perspective view of the fastener of FIG. 1, in unfastened state.

FIG. 3 is a rear view of a truck using the tie-down system of the present invention.

DETAILED DESCRIPTION OF THE PREFERRED EMBODIMENTS

A preferred embodiment of a cargo carrier tie-down system, according to the present invention, makes use of a fastener 10, as best shown in FIG. 2. Fastener 10 includes a first element 12 that includes a wall 14 in closed form, defining an opening 16. Wall 14 also defines a pair of aligned apertures 18, through which a pin 20 may be inserted, thus partitioning opening 16 into two smaller openings. Pin 20 is preferably a locking pin with release button 21 and pair of locking bumps, that lock into an outward position when button 21 is released. A "snap-lock" or spring pin, having a rod and a wire closure that is permanently attached at one end of the rod and securely engageable at the other end of the rod, could also be used for pin 20.

A pair of arms 22 extend outwardly from wall 14 and are bridged by a spring pin 24 (FIG. 3) that anchors a chain 26. The second element 30 is in the form of a knob having a head 32, a neck 34 and shoulders 36.

To use fastener 10, the head 32 is fit through opening 16, while the pin 20 is disengaged. Pin 20 is then inserted into apertures 18, thus trapping element 30 by the neck 34, with the head 32 on one side of opening 16 and shoulders 36 on the other, and the pin 20 blocking removal of the head 32.

Referring to FIG. 3, a truck tie-down system uses the fasteners of FIGS. 1 and 2, with knobs 30 (which may be trailer hitch knobs) attached to the bottom-side of the truck trailer 38, shackle elements 14 attached to knobs 30, as shown, with chains 26 connecting shackle elements 14, to tie down a load 40. In an alternative preferred embodiment, knobs 30 are attached to the chains 26 and engage with shackle elements 14, attached to the bottom-side of truck trailer.

The advantages of this system should now be apparent. Shackle element 14 has the strength of a permanently closed form, as opposed to a device such as a carabineer that has an open construction and is only closed by a moveable piece. This cannot impart the same strength as a closed form. Nevertheless, even though shackle element 14 is always closed, it still can be locked and unlocked by means of pin 20, which effectively reduces the size of opening 16, to retain head 32. It should also be noted that the only part that must be made is shackle element 14, with knobs 30 being generally available as trailer hitches and pins 20 also being an already available commercial item.

Shackle elements 14 may be machined from a steel plate or drop forged and then machined to create the apertures 18. In one preferred embodiment, shackle element 14 has been machined from a 2.54 (1 inch) thick steel plate. Shackle element 14 may be painted to prevent corrosion and to be readily visible to a user.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of tying down cargo on a cargo carrier, comprising:
   (a) providing a fastener, including:
      (i) a shackle fastener element that includes a wall in a form that is closed in two dimensions, defining an opening, and wherein said wall also defines a pair of opposed apertures;
      (ii) a pin that can be inserted into said two apertures;
      (iii) a knob fastener element having head and a neck, said head being sized to be passed through said opening when said pin is withdrawn from said wall, and that is retained when said pin is inserted into said pair of apertures;
   (b) attaching one of said fastener elements to a tension member and attaching one of said fastener elements, that can be engaged to said fastener element attached to said tension member, to said cargo carrier; and
   (c) engaging said fastener element on said tension member to said fastener element on said cargo carrier and inserting said pin into said shackle fastener element.

2. The method of claim 1, wherein said cargo carrier is a cargo trailer of a truck.

3. The method of claim 1, wherein said tension member has a shackle element on ends thereof and said cargo carrier has at least one knob element on sides thereof.

4. The method of claim 1, wherein said shackle element wall is made of steel.

5. The method of claim 1, wherein said opening is elliptical.

6. The method of claim 5, wherein said opening is circular.

7. The method of claim 1, wherein said tension member is a chain.

* * * * *

UNITED STATES PATENT AND TRADEMARK OFFICE
Certificate

Patent No. 8,182,181 B2                                                       Patented: May 22, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Douglas A. Coleman, Hubbard, OR (US).

Signed and Sealed this Thirteenth Day of November 2012.

<div style="text-align: right;">
D. GLENN DAYOAN<br>
<i>Supervisory Patent Examiner</i><br>
Art Unit 3612<br>
Technology Center 3600
</div>